US006327140B1

(12) United States Patent
Hashizawa et al.

(10) Patent No.: US 6,327,140 B1
(45) Date of Patent: Dec. 4, 2001

(54) POWER-SUPPLY BREAKER APPARATUS

(75) Inventors: Shigemi Hashizawa; Hidehiko Kuboshima; Masayuki Karamatsu, all of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/487,489

(22) Filed: Jan. 19, 2000

(30) Foreign Application Priority Data

Jan. 27, 1999 (JP) .................................................. 11-18948

(51) Int. Cl.[7] .............................. H02B 1/18; H02B 1/26; H01H 85/20

(52) U.S. Cl. .......................... 361/642; 361/626; 361/646; 337/194

(58) Field of Search .................................... 361/104, 626, 361/642, 646, 833, 835, 837; 337/1, 4, 5, 9, 142, 186, 194, 208; 307/112, 116, 125, 130, 131, 149; 315/88, 93, 129, 130, 136; 340/500, 522, 540, 635, 652, 657, 660, 638, 639

(56) References Cited

U.S. PATENT DOCUMENTS 1,966,716 * 7/1934 Green .................................. 200/114
2,186,813 * 1/1940 Adam et al. ......................... 200/114
2,289,122 * 7/1942 Jackson et al. ...................... 200/114
2,636,096 * 4/1953 Blasi ................................ 200/115.5
3,030,474 * 4/1962 Scott, Jr. ............................ 200/133
3,202,788 * 8/1965 George ................................ 200/133
3,358,100 * 12/1967 Schleicher ........................... 200/114
3,379,842 * 4/1968 Downs et al. ....................... 200/114
3,775,727 * 11/1973 Wise ................................. 339/14 R
3,840,781 * 10/1974 Brown ................................... 317/16
4,283,100 * 8/1981 Griffin et al. .......................... 339/19
4,500,862 * 2/1985 Shedd ..................................... 337/32
4,767,359 * 8/1988 Martell ................................ 439/535
4,871,924 * 10/1989 Sellati .................................... 307/86
5,906,508 * 5/1999 Jeffcoat ............................... 439/509
5,973,418 * 10/1999 Ciesielka et al. .................... 307/130
5,993,225 * 11/1999 Johnson et al. ...................... 439/136

FOREIGN PATENT DOCUMENTS

0411216-A1 * 2/1991 (EP) .................................... 439/101
11-176507-A * 7/1999 (JP) .............................. H01R/13/44

* cited by examiner

*Primary Examiner*—Leo P. Picard
*Assistant Examiner*—Anatoly Vortman
(74) *Attorney, Agent, or Firm*—Finnegan, Henderson, Farabow, Garrett & Dunner, L.L.P.

(57) ABSTRACT

A power-supply breaker apparatus of the present invention includes a fuse provided between a power supply and a load in an electric circuit, an apparatus main body for housing the fuse, a pair of main body side terminals, a plug housing chamber for housing the plug in the apparatus main body movably in a fitting/detaching direction, and a pair of plug side terminals which become conductive with each other in the plug. The electric circuit is electrically conductive via the fuse, and the pair of main body side terminals are supported to the apparatus main body movably in a direction crossing substantially perpendicularly to the fitting/detaching direction, and one of the pair of the main body side terminals is connected with the power supply, and the other terminal is connected with the load. Moreover, when the plug is moved in the fitting/detaching direction, the pair of plug side terminals are freely fitted into and detached from the pair of main body side terminals.

7 Claims, 5 Drawing Sheets

POWER-SUPPLY BREAKER APPARATUS

BACKGROUND OF THE INVENTION

The present invention relates to a power-supply breaker apparatus, and more specifically relates to a power-supply breaker apparatus for breaking an electric circuit suitably when operational maintenance for a power-supply circuit and equipments of an electric automobile and the like is performed.

In recent years, since a transportation equipment such as an electric automobile is provided with a high-voltage portion for driving a motor, it is equipped with a power-supply breaker apparatus taking maintenance into consideration.

SUMMARY OF THE INVENTION

According to the examination by the inventors, a power-supply breaker apparatus shown in FIGS. 7 and 8 is suggested.

As shown in FIGS. 7 and 8, a pair of main body side terminals 2 and 3 are provided in an apparatus main body 1 of the power-supply breaker apparatus so as to be fastened thereto by screws 4.

Base ends of a pair of operation side terminals 5 and 6 are rotatively supported to the apparatus main body 1, and the ends of the pair of operation side terminals 5 and 6 are connected at a holding section 7.

In such a structure, the holding section 7 is rotated in a counterclockwise direction in the drawing, and the pair of operation side terminals 5 and 6 are fitted between nipping end pieces 2*a* and 2*a* and between nipping end pieces 3*a* and 3*a* of the pair of main body side terminals 2 and 3 so that the electric circuit is conductive.

Meanwhile, the holding section 7 in this state is rotated in a clockwise direction in the drawing and the pair of operation side terminals 5 and 6 are detached from the pair of main body side terminals 2 and 3 so that the electric circuit is broken.

Therefore, when the transpiration equipment equipped with the power-supply breaker apparatus is maintained, the electric circuit can be broken.

However, in this power-supply breaker apparatus, since the pair of main body side terminals 2 and 3, which are receiving sides of the pair of operation side terminals 5 and 6, are fixed to the apparatus main body 1, if a pitch P1 between the pair of main body side terminals 2 and 3 differs from a pitch P2 between the pair of operation side terminals 5 and 6, a fit detaching force between both the terminals increases so that operability of the holding section 7 is deteriorated.

Therefore, the present invention has been achieved in order to solve the above examined problem. It therefore is an object of the present invention to provide a power-supply breaker apparatus in which even in the case where a pitch between one pair of terminals for making conductive/breaking an electric circuit differs from a pitch between the other pair of terminals, a fit detaching force (fitting/detaching force) between both the terminals does not increase and operability of a plug can be improved.

A power-supply breaker apparatus of the present invention includes a fuse provided between a power supply and a load in an electric circuit, an apparatus main body for housing the fuse, a pair of main body side terminals, a plug housing chamber for housing a plug movably in the fitting/detaching direction in the apparatus main body, and a pair of plug side terminals being conductive with each other in the plug. Here, the electric circuit becomes conductive via the fuse, and the pair of main body side terminals are supported in the apparatus main body movably in a direction crossing substantially perpendicularly to a fitting/detaching direction, and one of the pair of main body side terminals is connected with the power supply, and the other terminal is connected with the load. Moreover, the plug moves in the fitting/detaching direction so that the pair of plug side terminals are freely fitted into and detached from the pair of main body side terminals.

In this structure, even if the pitch of the pair of main body side terminals differs from the pitch of the pair of plug side terminals, the pair of main body side terminals are movable in the direction crossing perpendicularly to the terminal fitting/detaching direction, and the pair of the main body side terminals move so as to accord with the pitch of the pair of plug side terminals. As a result, the difference of pitches can be absorbed securely, and a fitting/detaching force between both the terminals can be approximately constant.

As a result, operability of the plug can be improved efficiently.

In addition, the pair of the main body side terminals can be connected respectively with electric wires which move freely.

The fuse is provided between one of the pair of the main body side terminals and the power supply.

In addition, the power-supply breaker apparatus can be structured that an operation lever is provided and it is supported rotatively to the apparatus main body, and the plug is movable in the fitting direction of the terminal fitting/detaching direction by operating the operation lever.

According to this structure, since the plug can be moved in the terminal fitting direction by operating the operation lever, the operability of the plug can be further improved.

In addition, it is preferable that the pair of main body side terminals are formed by substantially cylindrical female terminals and the pair of plug side terminals are formed by round pin shaped male terminals.

According to this structure, since the main body side terminals are composed of the substantially cylindrical female terminals for general purpose, the cost can be lowered, and a maintenance performance can be securely improved.

In addition, it is preferable that a rectangular projected surface is provided to the plug, and the pair of plug side terminals are positioned on a diagonal line of the projected surface.

According to this structure, since an area of the terminal projected surface of the plug can be small, the plug and the whole apparatus can be further miniaturized.

In addition, it is preferable that in the apparatus main body and the plug, a pair of conduciveness detection-use terminals, which are fitted into and detached from each other according to fitting and detaching between the pair of main body side terminals and the plug side terminals, are provided respectively.

According to this structure, since the pair of conduciveness detection-use terminals on the apparatus main body side are fitted into and detached from the pair of conduciveness detection-use terminals on the plug side according to the fitting and detaching between the pair of main body side terminals and the pair of plug side terminals, the conductive and breaking states of the electric circuit can be detected easily and securely.

DETAILED DESCRIPTION OF THE PREFERRED EMBODIMENTS

Figure 1:
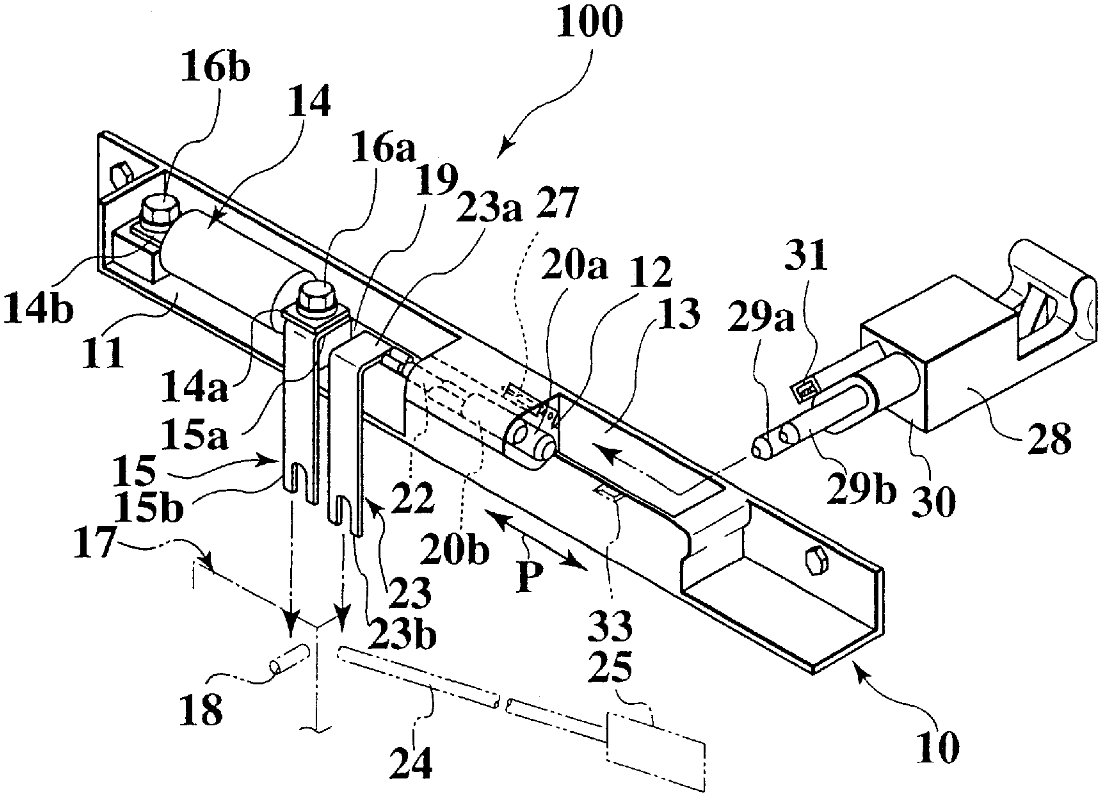
FIG. 1 is a perspective view of a power-supply breaker apparatus according to a first embodiment of the present invention.

There will be detailed below embodiments of the present invention with reference to the diagrams.

At first, the description will be given as to a power-supply breaker apparatus according to the first embodiment of the present invention.

As shown in FIGS. 1 through 4, in a substantially box-shaped apparatus main body 10, made of synthetic resin, of a power-supply breaker apparatus 100 of the present invention, a fuse housing chamber 11, a quadratic piped terminal housing chamber 12 and a plug housing chamber 13 are provided on a straight line.

A fuse 14 is housed in the fuse housing chamber 11.

One fuse terminal 14*a* of the fuse 14 as well as one end 15*a* of a power-supply side bus bar 15 is fastened by a bolt 16*a* so that the fuse 14 is electrically connected with the power-supply side bus bar 15. The other end 15*b* of the power-supply side bus bar 15 is connected with a battery post (electrode) 18 of a battery (power supply) 17.

In addition, the other fuse terminal 14*b* of the fuse 14 as well as one end of one electric wire 19 is fastened by a bolt 16*b* so that the fuse 14 is electrically connected with the electric wire 19.

A pair of main body side terminals 20*a* and 20*b* are housed in the quadratic piped terminal housing chamber 12.

The pair of main body side terminals 20*a* and 20*b* are supported by a plurality of flexible engagement claws, not shown, provided on an outer circumferential side so as to be capable of floating. Namely, when a force is applied to the main body side terminals 20*a* and 20*b*, which are supported by so called lance structure composed of a plurality of the flexible engagement claws, in a direction (a direction X or Y shown in FIG. 2) crossing perpendicularly to terminal fitting/detaching directions (a direction of an arrow P which is a terminal inserting-into and pulling-off direction shown in FIG. 1), the main body side terminals 20*a* and 20*b* move in that direction freely. The main body side terminals 20*a* and 20*b* are composed of substantially cylindrical female terminals for general purpose which present a low fitting/detaching force, and the terminals 20*a* and 20*b* are positioned so that their terminal fitting holes 21, 21 face the plug housing chamber 13.

In addition, one main body side terminal 20*a* of the pair of main body side terminals 20*a* and 20*b* is connected with the other end of the electric wire 19, and the otter main body side terminal 20*b* is connected with one end of the other electric wire 22 by caulking or the like.

Meanwhile, the other end of the electric wire 22 is connected with one end 23*a* side of load side bus bar 23 by caulking or the like.

The other end 23*b* of the load side bus bar 23 as well as an end of another electric wire 24 is fixed by fixing means such as a bolt, not shown, and is connected with a motor (load) 25 via the electric wire 24 or the like.

Figure 2:
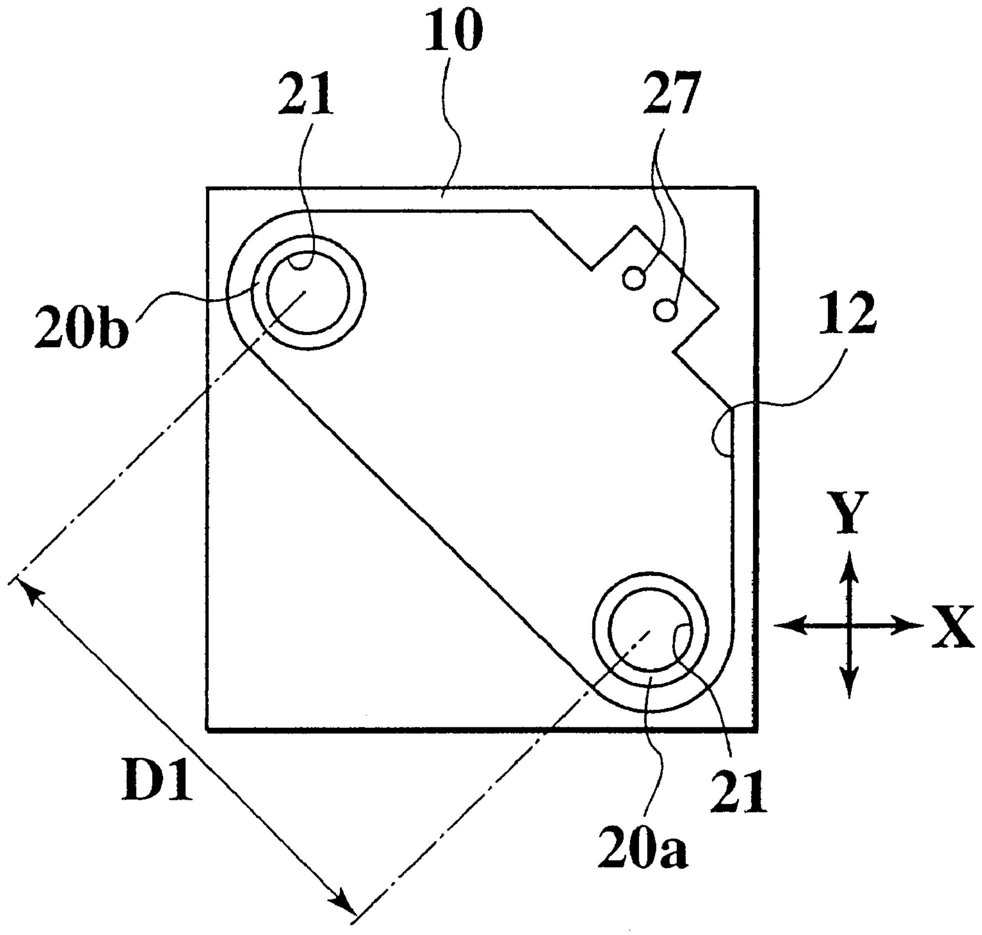
FIG. 2 is an explanatory diagram that main body side terminals of the power-supply breaker apparatus according to the first embodiment are viewed from a terminal fitting surface side.

In addition, as mainly shown in FIGS. 1 and 2, a pair of conduciveness detection-use terminals 27, 27 are positioned in the terminal housing chamber 12. Respective electric wires which are connected with the pair of conduciveness detection-use terminals 27, 27, are led to a conduciveness detection circuit (not shown).

A plug 28 whose main body is made of synthetic resin is positioned in the plug housing chamber 13 so as to be slidably in a terminal fitting/detaching direction (a direction of an arrow P in FIG. 1).

A pair of plug side terminals 29*a* and 29*b* are fixed to the plug 28. Electrical conduciveness is obtained between the pair of plug side terminals 29*a* and 29*b*. The plug side terminals 29*a* and 29*b* are composed of round pin shaped male terminals for general purpose which present a low fitting/detaching force, and are positioned so that their ends face towards the terminal housing chamber 12.

Figure 3:
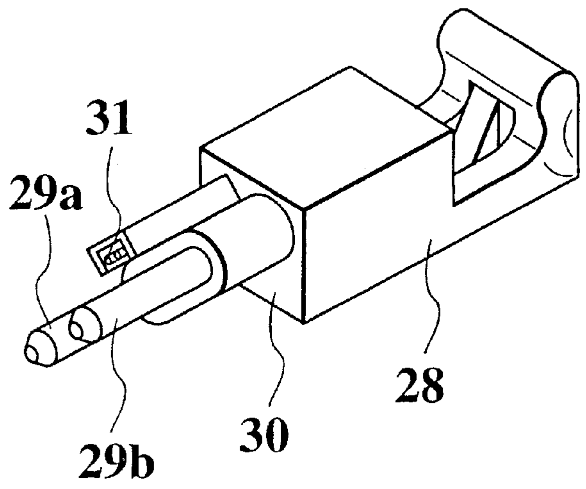
FIG. 3 is a perspective view of a plug of the power-supply breaker apparatus according to the first embodiment.
Figure 4:
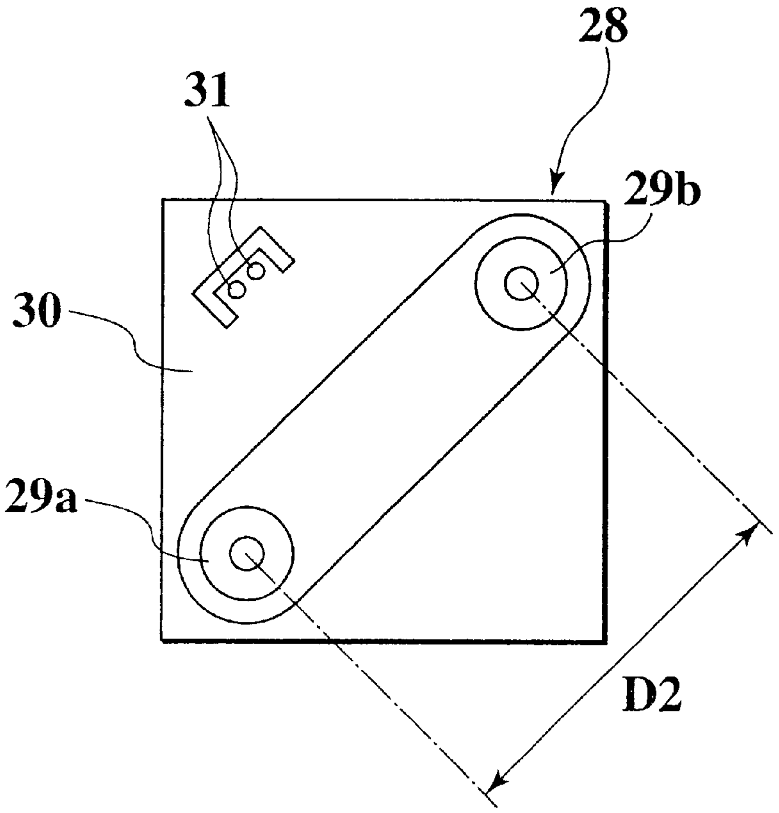
FIG. 4 is an explanatory diagram that the plug of the power-supply breaker apparatus according to the first embodiment is viewed from a terminal projected surface side.

As mainly shown in FIGS. 3 and 4, a terminal projected surface 30, 30 of the plug 28 is formed into a rectangular shape, and the pair of plug side terminals 29*a* and 29*b* are provided in positions on a diagonal line of the terminal projected surface 30, 30.

In addition, as mainly shown in FIGS. 1, 3 and 4, a pair of round pin shaped conduciveness detection-use terminals 31, 31 are projected from the plug 28.

Electrical conduciveness is obtained between the pair of conduciveness detection-use terminals 31, 31. As for the pair of conduciveness detection-use terminals 31, 31 on the plug 28 side and the pair of substantially cylindrical conduciveness detection-use terminals 27, 27 on the apparatus main body 10 side, their positional relationship is set so that the terminals 31, 31 are fitted into/detached from the terminals 27, 27 according to fitting and detachment between the plug side terminals 29*a* and 29*b* the main body side terminals 20*a* and 20*b*.

A lock-use projection (engagement section) 33 is provided on a lower surface of the plug housing chamber 13, and a lock-use groove (not shown) as an engagement section which is engaged with the projection 33 is provided on the plug 28. The positional relationship is set so that the lock-use projection 33 is engaged with the lock-use groove in a terminal fit completing position of the plug 28.

There will be described below an operation of the power-supply breaker apparatus having the above structure.

At first, when the plug 28 in the plug housing chamber 13 is slid in the terminal fitting direction, the ends of the plug side terminals 29*a* and 29*b* are fitted into the terminal fitting holes 21, 21 of the main body side terminals 20*a* and 20*b*. At the same time, the conduciveness detection-use terminals

31, 31 on the plug side are also fitted into the conduciveness detection-use terminals 27, 27 on the apparatus main body 10 side.

When the plug 28 is inserted to the terminal fit completing position, the lock-use groove of the plug 28 is engaged with the lock-use projection 33 so as to be locked.

As a result, the conduciveness state is obtained between the main body side terminals 20*a* and 20*b* via the plug side terminals 29*a* and 29*b* so that the power of the battery 17 can be supplied to the motor 25.

Meanwhile, in the case where maintenance or the like is executed, when the plug 28 in the plug housing chamber 13 is slid in the terminal detaching direction (terminal pulling-out direction), the plug side terminals 29*a* and 29*b* are pulled out of the terminal fitting holes 21, 21 of the main body side terminals 20*a* and 20*b*. At the same time, the conduciveness detection-use terminals 31, 31 on the plug side are also pulled out of the conduciveness detection-use terminals 27, 27 on the main body 10 side.

As a result, the breaking state is obtained between the main body side terminals 20*a* and 20*b*, and thus the power of the battery 17 is not supplied to the motor 25.

Therefore, in this case, the electric circuit is set into the breaking state.

In the above operation, when the plug side terminals 29*a* and 29*b* are fitted into the main body side terminals 20*a* and 20*b*, if a pitch D2 of the plug side terminals 29*a* and 29*b* differs from a pitch D1 between the main body side terminals 20*a* and 20*b*, the plug side terminals 29*a* and 29*b* presses the main body side terminals 20*a* and 20*b* in the direction crossing perpendicularly to the terminal fitting/detaching direction P.

As a result, the main body side terminals 20*a* and 20*b* are moved freely in the pressing direction by the lance structure composed of the plural flexible engagement claws, and are connected with the flexible electric wires 19 and 22. As a result, the main body side terminals 20*a* and 20*b* shift in the pressing direction so that the difference of the pitches is absorbed.

Therefore, even in the case where the pitches differ from each other as mentioned above, an increase in the sliding force of the plug 28 is suppressed, and thus the operability of the plug 28 can be improved.

In addition, also in the case where the plug side terminals 29*a* and 29*b* are pulled out of the main body side terminals 20*a* and 20*b*, even if the pitches differs from each other, an increase in the sliding force of the plug 28 is suppressed, and thus the operability of the plug 28 can be improved.

In addition, in the above-mentioned operation, according to the fitting and detachment between the main body side terminals 20*a* and 20*b* and the plug side terminals 29*a* and 29*b*, the conduciveness detection-use terminals 27, 27 on the apparatus main body 10 side are fitted into or detached from the conduciveness detection-use terminals 31, 31 on the plug 28 side, and thus the conductive and breaking states of the electric circuit can be detected easily and securely.

In addition, in the present embodiment, since the main body side terminals 20*a* and 20*b* are composed of the substantially cylindrical female terminals and the electrically conductive members of the female terminals are not exposed to the outside, an electric current can be prevented from flowing the external portion or the like unnecessarily. Needless to say, since the female terminals are for general purpose, the cost of the whole apparatus can be lowered.

In addition, in the present embodiment, the terminal projected surface 30, 30 of the plug 28 is formed into the rectangular shape and the plug side terminals 29*a* and 29*b* are provided in the positions on the diagonal line of the terminal projected surface 30, 30. As a result, an area of the terminal projected surface 30, 30 of the plug 28 can be small, and thus the plug 28 and the whole apparatus can be miniaturized.

There will be described below the power-supply breaker apparatus according to the second embodiment of the present invention.

In the present embodiment, the same reference numerals are given to the same structured portions as those in the first embodiment, and the description thereof is omitted, and differently structured portions will be described.

Figure 5:
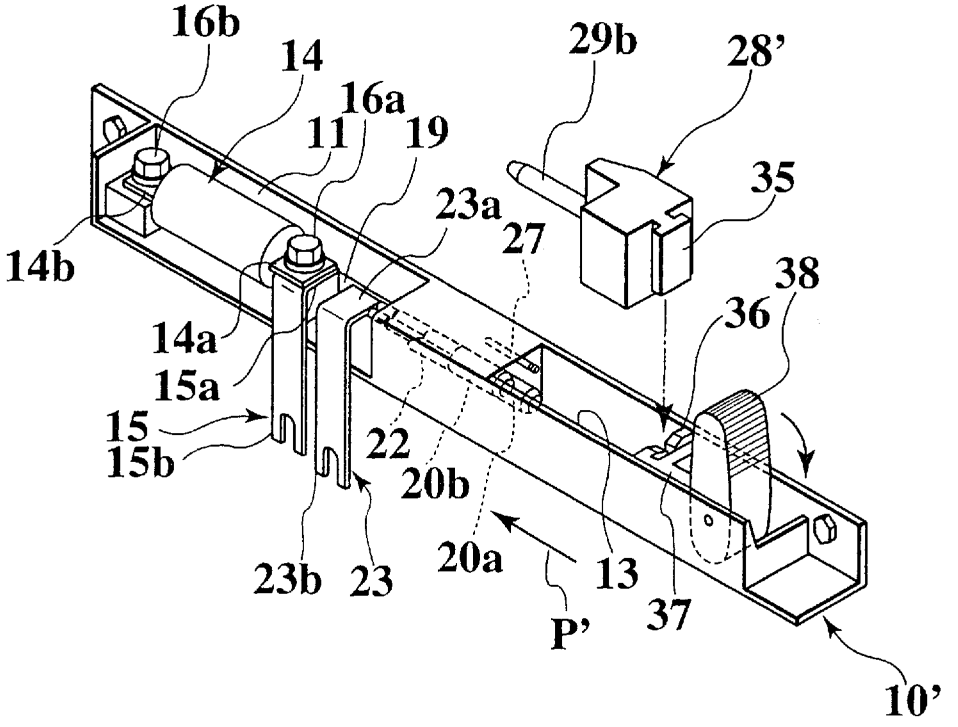
FIG. 5 is a perspective view of the power-supply breaker apparatus according to a second embodiment of the present invention.
Figure 6:
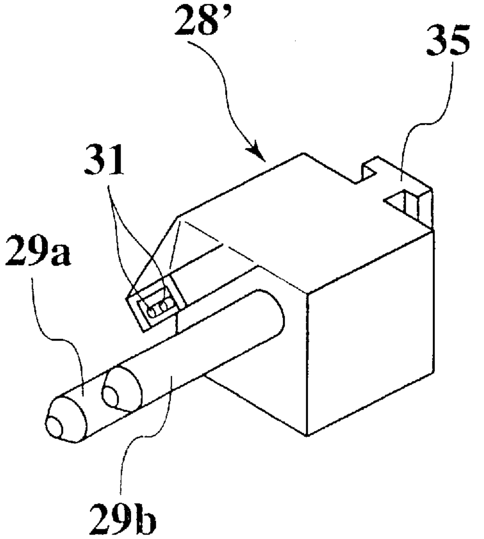
FIG. 6 is a perspective view of a plug of the power-supply breaker apparatus according to the second embodiment.
Figure 7:
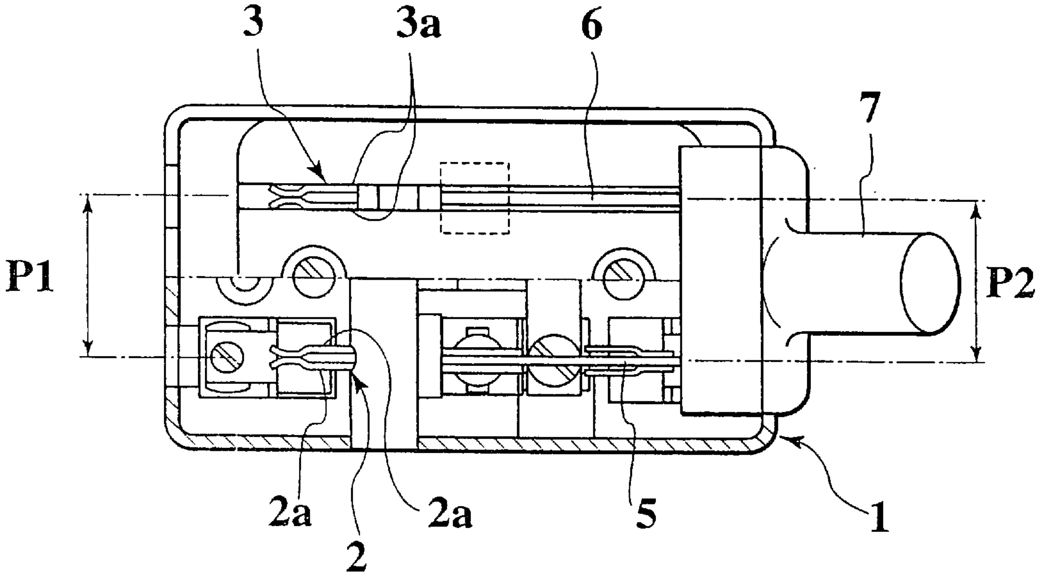
FIG.7 PRIOR ART
FIG. 7 is a plan view showing one portion, broken away, of the power-supply breaker apparatus according to an examination of the inventors.
Figure 8:
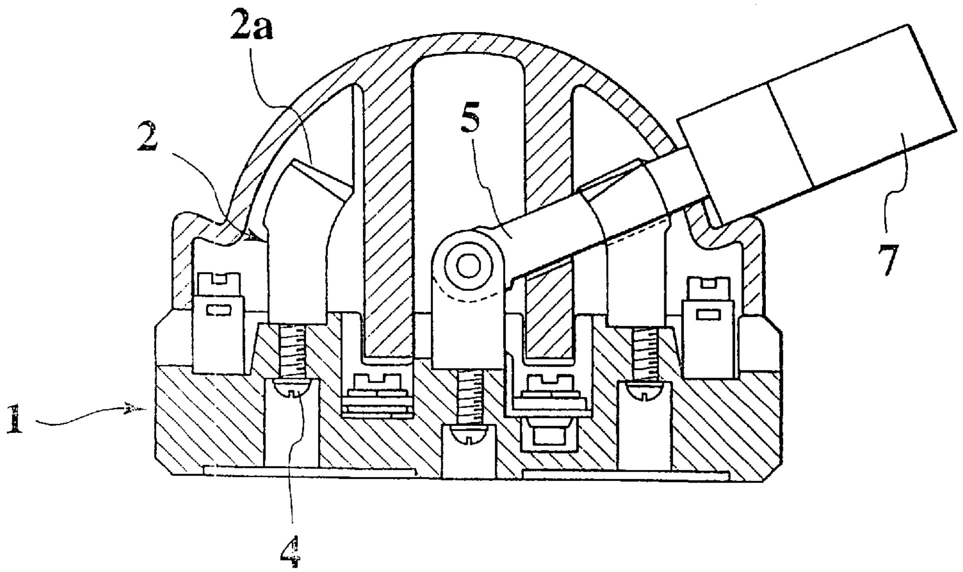
FIG.8 PRIOR ART
FIG. 8 is a sectional view of the power-supply breaker apparatus according to the examination of the inventors.

In FIGS. 5 and 6, an engagement projection 35 whose plane has a T shape is projected integrally with a rear face side of a plug 28' made of synthetic resin, and an auxiliary slider 37 made of synthetic resin, which has an engagement groove 36 with which the engagement projection 35 is engaged, is positioned in a rear side of the plug housing chamber 13.

The auxiliary slider 37 is connected with an operation lever 38, and the operation lever 38 is supported into the rear portion of the plug housing chamber 13 so as to be freely oscillated (rotated) between a stand state and a laid state shown in FIG. 5.

When the operation lever 38 is oscillated from the stand state to the laid state, the auxiliary slider 37 slides in a terminal fitting direction P'.

Meanwhile, in the case where the pair of main body side terminals 20*a* and 20*b* are detached from the pair of plug side terminals 29*a* and 29*b*, after the operation lever 38 is manually oscillated from the laid state to the stand state, it is necessary to manually slide the auxiliary slider 37 in a terminal detaching direction (terminal pulling-out direction).

In the above structure, when an operator oscillates the operation lever 38 from the stand state to the laid state, the plug 28' which was engaged with the auxiliary slider 37 slides in the terminal fitting direction P', the ends of the plug side terminals 29*a* and 29*b* are fitted into the terminal fitting holes 21, 21 of the main body side terminals 20*a* and 20*b*. At the same time, the pair of conduciveness detection-use terminals 31, 31 on the plug 28' side are also fitted into the pair of conduciveness detection-use terminals 27, 27.

As a result, the conductive state is obtained between the main body side terminals 20*a* and 20*b* via the plug side terminals 29*a* and 29*b*, and thus the power of the battery 17 can be supplied to the motor (load) 25.

Meanwhile, in the case where maintenance or the like is executed, after the operator oscillates the operation lever 38 from the laid state to the stand state, the auxiliary slider 37 is further slid in the terminal detaching direction, and the plug side terminals 29*a* and 29*b* are pulled out of the terminal fitting holes 21, 21 of the main body side terminals 20*a* and 20*b*. At this time, the conduciveness detection-use terminals 31, 31 on the plug 28' side are also pulled out of the conduciveness detection-use terminals 27, 27 on the apparatus main body 10' side.

As a result, the breaking state is obtained between the main body side terminals 20*a* and 20*b*, and thus the power of the battery 17 is not supplied to the motor 25.

Therefore, also in the present embodiment, while the function and effect similar to those in the first embodiment are being secured, the plug 28' can be moved in the terminal fitting direction P' by operating the operation lever 38 with a weak force. Therefore, there is an advantage that the fitting operation of the plug 28' is more easy.

In the aforementioned embodiments, the main body side terminals 20*a* and 20*b* are supported movably in the direction crossing perpendicularly to the terminal fitting/detaching direction by the lance structure composed of the plurality of flexible engagement claws, but structures other than the lance structure may be adopted as long as the main body side terminals 20*a* and 20*b* can be supported movable in the direction crossing perpendicularly to the terminal fitting/detaching direction.

This invention may be embodied in several forms without departing from the spirit of essential characteristics thereof.

What is claimed is:

1. A power-supply breaker apparatus, comprising:

a fuse provided between a power supply and a load in an electric circuit, the electric circuit becoming conductive through the fuse;

an apparatus main body housing the fuse;

a pair of main body side terminals supported in the apparatus main body movably in a direction crossing substantially perpendicularly to a fitting/detaching direction, one of the pair of main body side terminals being connected with the power supply, and the other of the pair of main body side terminals being connected with the load;

a plug housing chamber housing a plug movably in the fitting/detaching direction in the apparatus main body; and a pair of plug side terminals being conductive with each other in the plug, wherein the plug moves in the fitting/detaching direction so that the pair of plug side terminals are freely fitted into and detached from the pair of main body side terminals.

2. A power-supply breaker apparatus according to claim 1, wherein when the pair of plug side terminals are fitted into and detached from the pair of main body side terminals, the pair of main body side terminals are movable in the direction crossing substantially perpendicularly to the fitting/detaching direction.

3. A power-supply breaker apparatus according to claim 1, wherein the fuse is provided between one of the pair of main body side terminals and the power supply.

4. A power-supply breaker apparatus according to claim 1, wherein an operation lever is supported rotatively to the apparatus main body, and the plug is movable in a fitting direction of the fitting/detaching direction by operating the operation lever.

5. A power-supply breaker apparatus according to claim 1, wherein the pair of main body side terminals are formed by substantially cylindrical female terminals, and the pair of plug side terminals are formed by round pin shaped male terminals.

6. A power-supply breaker apparatus according to claim 1, wherein a rectangular projected surface is provided to the plug, and the pair of plug side terminals are positioned on a diagonal line of the projected surface.

7. A power-supply breaker apparatus according to claim 1, wherein in the apparatus main body and the plug, a pair of conduciveness detection-use terminals, which are fitted into and detached from each other according to fitting and detaching between the pair of main body side terminals and the plug side terminals, are provided respectively.

* * * * *

UNITED STATES PATENT AND TRADEMARK OFFICE

CERTIFICATE OF CORRECTION

PATENT NO. : 6,327,140 B1

DATED : December 4, 2001

INVENTOR(S) : Shigemi Hashizawa, Hidehiko Kuboshima and Masayuki Karamatsu

It is certified that error appears in the above-identified patent and that said Letters Patent is hereby corrected as shown below:

Column 8,
Line 29, "conduciveness" should read -- conductiveness --.

Signed and Sealed this

Twenty-sixth Day of November, 2002

*Attest:*

JAMES E. ROGAN

*Attesting Officer* *Director of the United States Patent and Trademark Office*